Dec. 14, 1954     F. J. LASAK     2,697,058
PRESSURE-TIGHT METAL-TO-POLYETHYLENE SEAL
Filed Jan. 24, 1952
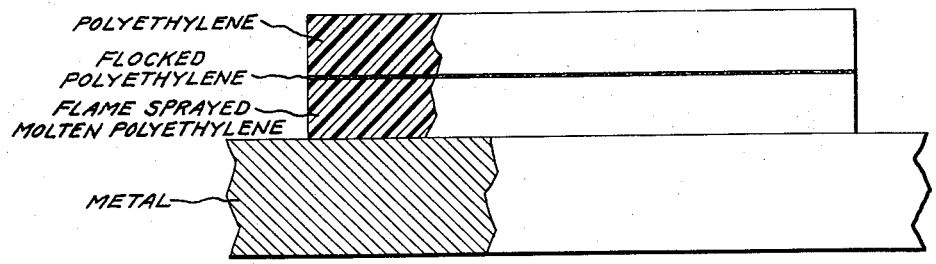
Inventor:
Frank J. Lasak,
by (signature)
His Attorney.

United States Patent Office 2,697,058
Patented Dec. 14, 1954

2,697,058

PRESSURE-TIGHT METAL-TO-POLYETHYLENE SEAL

Frank J. Lasak, Schenectady, N. Y., assignor to General Electric Company, a corporation of New York Application January 24, 1952, Serial No. 268,131

3 Claims. (Cl. 154—122)

The present invention relates to a pressure-tight metal-to-polyethylene seal. More particularly, it is concerned with the joining or bonding of a polyethylene member to a metal member by a novel method adapted to form a pressure-tight joint between the two members.

The polyethylene members with which the present invention is concerned are those composed of the plastic material obtained by polymerizing ethylene. Ordinarily, the polymerization is carried out at elevated temperatures and at high pressures. The resultant plastic products are extremely solvent-resistant and possess good dimensional stability at elevated temperatures up to very close to their melting points. For that reason, forming methods employed with these plastics are limited. For example, it is known that two polyethylene members can be joined by a welding process employing a hot inert gas stream to bring the welded areas up to temperature. Ordinary gas flames cannot be employed for this purpose if a pressure-tight joint is desired. The inert gas method cannot be employed for welding or joining a polyethylene member to a metal part, as the polyethylene under these conditions does not satisfactorily bond to the metal surface.

It is also known that metal surfaces can be coated with a polyethylene resin coating by a process known as a flame-spraying process. This process, which is described on pages 274 to 275 of the 1951 Modern Plastics Encyclopedia and Engineers Handbook, comprises preheating the metal surface and thereafter spraying polyethylene particles onto the heated surface by means of a gas flame which serves to heat the particles and carry them onto the surface. The resultant coatings are well bonded to the metal surfaces. However, when it is attempted to seal or join a molded polyethylene part to this polyethylene coating, pressure-tight joints cannot consistently be obtained.

The present invention is based on the discovery that a satisfactory pressure-tight seal between a metal member and a polyethylene member can be obtained by a process which comprises flame spraying a coating of polyethylene onto the surface of the metal member, embedding a layer of polyethylene particles in the surface of the flame-sprayed layer while the flame-sprayed layer is maintained at a temperature above its softening point, and finally heat-sealing the polyethylene parts to the polyethylene particle-coated area.

In the course of the investigation which led to the present invention, it was found that whereas the usual polyethylene plastics in molded form or in the form of particles suitable for use in the flame-spraying process show little if any evidence of oxidation, flame-sprayed coatings of polyethylene show some evidence of oxidation which has probably taken place during the time the particles are conducted by the flame onto the surface being coated. Various samples of flame-sprayed polyethylene when tested by infra-red analysis gave moderate to weak absorption in the CO and COOH regions. It is believed that this slight oxidation of the polyethylene is at least partially responsible for the good adhesion obtained between the flame-sprayed coatings and the underlying metal surface. It also appears that this oxidation of the flame-sprayed polyethylene prevents the formation of a satisfactory bond between a flame-sprayed polyethylene surface and a molded or otherwise formed polyethylene part.

The present invention is based on the discovery that these sealing difficulties can be overcome and a satisfactory pressure-tight seal obtained by applying to the flame-sprayed coating a distinct layer of polyethylene particles and joining the polyethylene part to the particle-coated surface. The polyethylene particles should be blown or otherwise forcibly applied to the surface of the flame-sprayed coating while the coating is in a softened or molten condition so that the particles become embedded in and mechanically anchored to the flame-sprayed coating. The polyethylene particles are applied under conditions which prevent the melting or oxidation of these particles, and the application thereof is continued until the desired areas of the flame-sprayed surface takes on a frosted appearance. The particle-coated surface is the equivalent of the material which is to be joined to the metal part, and readily heat-seals to the molded part.

In the accompanying drawing the figure is a diagrammatic view, partly in elevation and partly in section, illustrating a construction produced in accordance with the method of the present invention.

In carrying the present invention into effect, the metal surface which may be of aluminum, copper, steel or other metal or alloy is first carefully cleaned and uniformly roughened by sand blasting or shot blasting. After cleaning, the surface should be preheated before application of the flame-sprayed coating of polyethylene. In general, the metal part is preheated to a temperature of from 200 to 250° C. and preferably in the neighborhood of about 225° C.

Any suitable flame-spraying equipment can be employed for the purpose of applying the flame-sprayed coating of polyethylene. A suitable type of equipment is described in the 1951 Plastics Encyclopedia and Engineers Handbook, pages 274 and 275. The equipment comprises a spray torch which is preferably operated with acetylene as the combustible gas. The polyethylene is supplied to the gun as a powder and is carried to the torch by means of a stream of air, which may form all or part of the air supplied to the torch as the combustion supporter.

During spraying of the polyethylene powder, the amount of air fed to the torch is restricted to give a somewhat reducing flame. As the powder passes from the gun into the flame, it is partially melted and fusion of the powder is completed as it strikes the hot metal surface. The powdered polyethylene is applied to the metal surface until a substantial coating of a thickness of at least $\frac{1}{32}$ inch is obtained.

The flocked coating of polyethylene particles can be conveniently applied employing the same spray equipment. All that is necessary is to close the valve controlling the acetylene fed to the torch and continue to spray the polyethylene powder ejected from the torch by the air stream. The first few layers of polyethylene applied in this manner will melt, due to the temperature of the metal surface, but as the surface gradually cools from the temperature at which it was maintained during the flame-spraying treatment, subsequent applications of the polyethylene powder will produce a frosted surface appearance. When the surface is uniformly frosted by the flocked powder, this step of the process is complete.

The polyethylene part is joined to the flocked surface by bringing the two into sealing relationship and heating the assembly to a temperature sufficient to soften the polyethylene. Preferably, with the two parts in sealing position, the metal part is heated by induction heating and, as the polyethylene softens, the polyethylene part is pressed or molded into firm engagement with the flock-coated surface portion of the metal part. Ordinarily, the assembly need be heated only up to or within the short softening range of the polyethylene as, for example, to a temperature of from about 110° to 130° C. As soon as the polyethylene part has been pressed into engagement with the flame-sprayed metal surface, the assembly is allowed to cool below the softening point of the polyethylene.

The resultant seal will be found to be pressure-tight. For example, metal and polyethylene parts joined in accordance with the present invention have been repeatedly subjected to a test cycle which comprises repeatedly heating the assembly to 160° F. and cooling it to room temperature, and have it remain pressure-tight (at 15 p. s. i. gauge pressure) even after 100 heating and cooling cycles.

Preferably, the particles of polyethylene powder employed in the flame-spraying process and in the flocking step should be small and of relatively uniform size. It has been found that a particle size of about 60 mesh is satisfactory for carrying out the present process, although it is to be understood that the process is not limited to a polyethylene flock of any particular particle size.

What I claim as new and desire to secure by Letters Patent of the United States is:

1. The method of joining a metal member to a polyethylene member which comprises flame-spraying a layer of polyethylene onto the surface of the metal member heated to a temperature of from 200° to 250° C., embedding a layer of polyethylene particles into the surface of the flame-sprayed layer as said flame-sprayed layer cools from a heat-softened state to a solid state, and joining the polyethylene member to the polyethylene particle-coated metal member by pressing said members together at the softening point temperature of the polyethylene, and allowing the joined members to cool below the softening point of the polyethylene.

2. The method of joining a metal part to a polyethylene part which comprises applying to the surface of the metal part heated to a temperature of from 200° to 250° C. a flame-sprayed coating of polyethylene and, while maintaining the polyethylene coating at a temperature substantially above its softening point, embedding a layer of polyethylene particles into the flame-sprayed coating and thereafter joining the polyethylene part to the polyethylene particle-coated metal part by pressing said parts together at the softening point temperature of the polyethylene and allowing the joined parts to cool below the softening point of the polyethylene.

3. The method of joining a metal part to a polyethylene part which comprises heating the metal part to a temperature of from 200 to 250° C. and, while maintaining the part at such temperature, flame-spraying onto said part a layer of polyethylene, flocking a layer of polyethylene particles onto the surface of the flame-sprayed layer by blowing said particles onto said flame-sprayed layer as the flame-sprayed layer cools from a molten to a solid state, and joining a polyethylene part to the flock-covered surface of the polyethylene coated metal part by pressing said parts together at a temperature of from about 110° to 130° C. and allowing said joined parts to cool below 110° C.

References Cited in the file of this patent

UNITED STATES PATENTS

| Number | Name | Date |
|---|---|---|
| 2,340,452 | Child et al. | Feb. 1, 1944 |
| 2,406,039 | Roedel | Aug. 20, 1946 |

FOREIGN PATENTS

| Number | Country | Date |
|---|---|---|
| 551,339 | Great Britain | Feb. 18, 1943 |

OTHER REFERENCES

"Modern Plastics," article, June 1950, pages 85–88.
"Coating With Polythene," article in "British Plastics" for August 1950, pages 56–59.